July 13, 1965　　　　R. D. CHUTE　　　　3,194,969
OPTICAL READER WITH INTEGRAL LENS AND LIGHT RESPONSIVE DEVICE
Filed Feb. 12, 1962　　　　　　　　　　　3 Sheets-Sheet 2

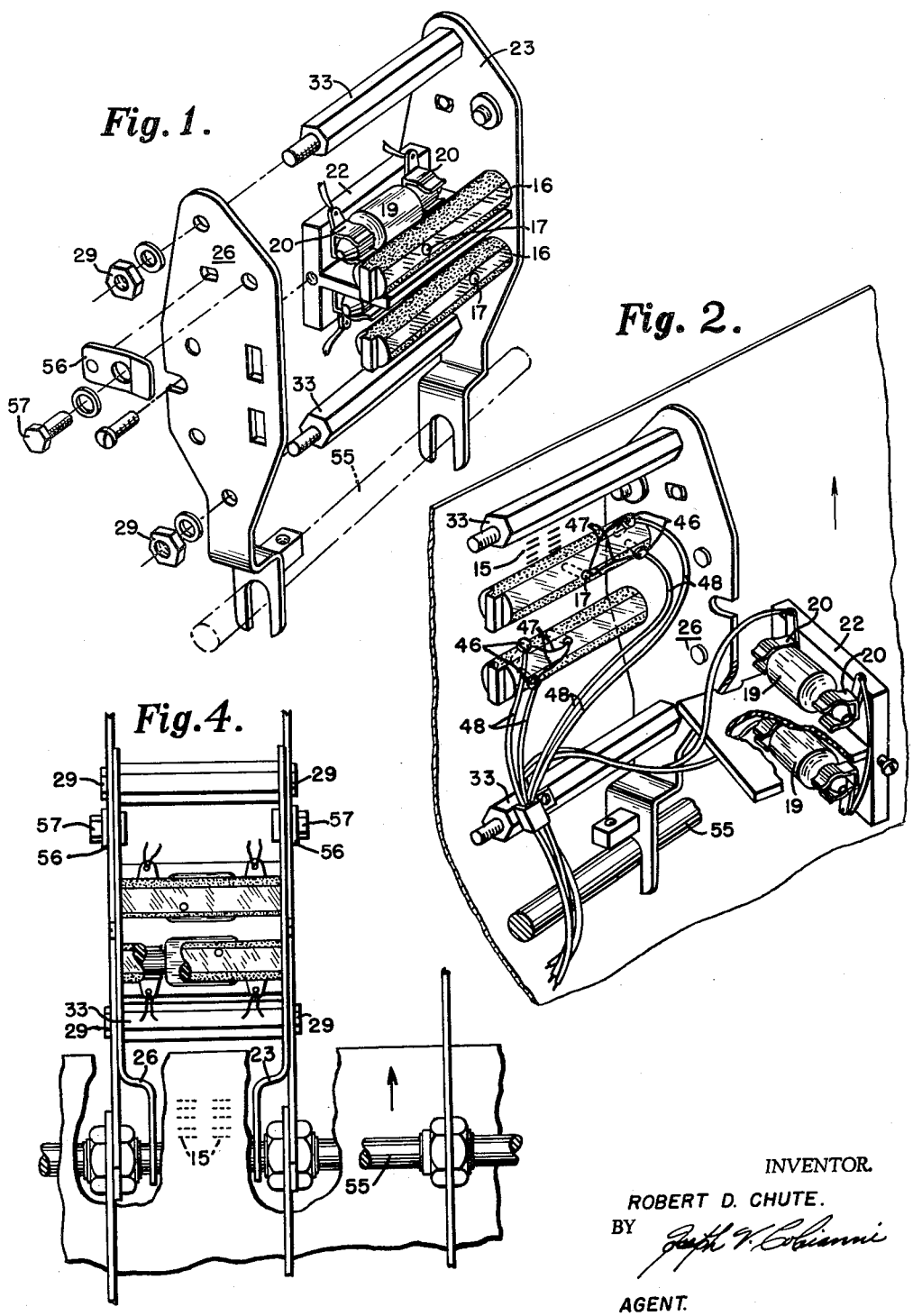

INVENTOR.
ROBERT D. CHUTE.
BY
AGENT.

July 13, 1965 R. D. CHUTE 3,194,969
OPTICAL READER WITH INTEGRAL LENS AND LIGHT RESPONSIVE DEVICE
Filed Feb. 12, 1962 3 Sheets-Sheet 3

INVENTOR.
ROBERT D. CHUTE.
BY
AGENT.

United States Patent Office 3,194,969
Patented July 13, 1965

3,194,969
OPTICAL READER WITH INTEGRAL LENS
AND LIGHT RESPONSIVE DEVICE
Robert D. Chute, Southfield, Mich., assignor to Burroughs
Corporation, Detroit, Mich., a corporation of Michigan
Filed Feb. 12, 1962, Ser. No. 172,453
6 Claims. (Cl. 250—216)

This invention relates to sensing apparatus and more particularly to apparatus for the sensing of indices on documents by use of a photosensitive element.

It is an object of this invention to provide a sensing apparatus which is capable of sensing indices having small transverse dimensions in the direction in which the medium bearing the indicia is transported past the sensing apparatus.

It is a further object of this invention to provide a system which senses indicia having small transverse dimensions and which is not sensitive to lateral movement of the indicia carrying documents relative to the sensing apparatus.

It is still a further object of this invention to provide for a photosensing unit which eliminates the problem of independently adjusting a sensing element and the focusing unit by providing for a novel unitary arrangement of the focusing unit and the sensing element.

It is another object of this invention to provide for a sensing unit which provides for a unique arrangement of the light source and the sensing and focusing elements on the same side of the document as the indices to be sensed.

It is still another object of this invention to provide a photosensing apparatus which is compact, easy to make, and simple to operate.

Still a further object is to utilize a control element for the sensing unit that has a wide range of resistance depending upon the presence or absence of light impinging upon it.

According to the present invention the sensing apparatus is applied to the detection of coded indices such as bars or stripes having a transverse axis or dimension considerably smaller than their longitudinal axis of dimension, and utilizes a novel positioning of the photosensitive element in the lens itself. This unique arrangement provides for a focused bar of light and the closest positioning possible of the photocell to the document and to the focused bar of light. In an arrangement wherein the sensing assembly is mounted on the same side of the indicia carrying documents as the lamp, the photocell will receive light reflected from an item fed past the light. The normal document surface seen by the photoconductive device is of a relatively high diffused light level while the indices to be sensed are at a relatively low light level due to the absorption of the light rays by the indices. The photocell is capable of sensing this reduction of reflected light and providing an output signal upon the sensing of the reduction of reflected light to indicate the presence of indices.

Other objects and many of the attendent advantages of this invention will be appreciated readily as the same becomes better understood by reference to the following detailed description and the appended claims, when considered in connection with the accompanying drawings wherein:

FIG. 1 is an exploded perspective view of a double lamp and lens assembly;

FIG. 2 is a partial perspective of the sensing assembly and shows a double lamp and lens unit with the lamp holding assembly displaced to better disclose the sensing element mounted in the cylindrical lens;

FIG. 4 is a bottom view of the assembly mounted in the document guideway of FIG. 3 and indicates two sensing units with individual photocells positioned to sense indicia in adjacent columns;

Figure 9:
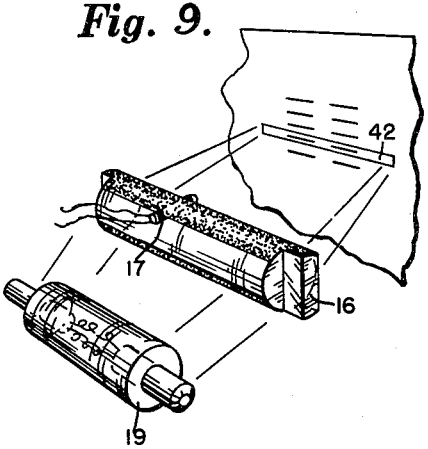
Figure 8:
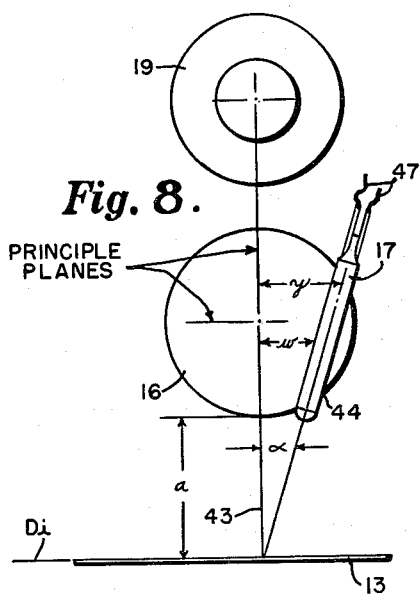

FIG. 8 discloses a front view of the lamp, lens, and photocell, relative to a document or image plane; and FIG. 9 shows the light from a lamp source focused by a cylindrical lens into a bar of light having a transverse dimension which is substantially equal to that of the indicia to be sensed.

Referring now to the drawings, like references designating like or corresponding parts throughout the views, there is shown in FIG. 1 a sensing apparatus comprising a spaced pair of mounting plates 23 and 26 between which are mounted the elements making up the sensing apparatus. Plate 26 is spaced from and removably secured to mounting plate 23 by way of spacer rods 33 having reduced threaded ends for receiving nuts 29. Mounted between the plates 23 and 26 is a cartridge clip board 22 having longitudinally spaced holding clips 20 in which is removably held a cylindrical light bulb 19. Mounted slightly below and in line with said light bulb is a cylindrical lens 16. The photosensitive cell 17 is inserted in a hole in the lens. A guideplate 13, which is better shown in FIG. 3 and which posses high absorption properties is positioned perpendicular to the focused bar of light. Lens 16 has a tongue shaped end which is designed to mate with and to be received in a rectangular aperture in end plate 26.

Document guide plate 13 forms the backplate over which the indicia carrying documents are transported. Guide plate 13 is made of steel with a black passivate coating and, therefore, has high light absorption properties. Although it was found that a reflective backplate would perform satisfactorily it was felt that improved reading of the indicia would result if a light absorbing backplate is employed. This improvement in operation results because when light is impinged on a light reflecting document some amount will not be reflected but will pass through the document and strike the backplate over which the document is being transported. Now if the backplate is highly reflective then the light striking it will be reflected back toward the document, and some will impinge upon the back side of the indicia to be sensed. This reflected light to the backside of the indicia will act to reduce the light absorptive properties of the indicia and therefore result in less light being absorbed, and more being reflected from the indicia to the photocell. This condition is undesirable, and to eliminate, or effectively reduce it to inconsequential consideration, applicant utilizes a highly absorptive backplate 13. As an alternative no backplate at all may be used, in which case the rays which pass through the paper will go out into space and not be reflected back to the back of the coded indicia.

Figure 3:
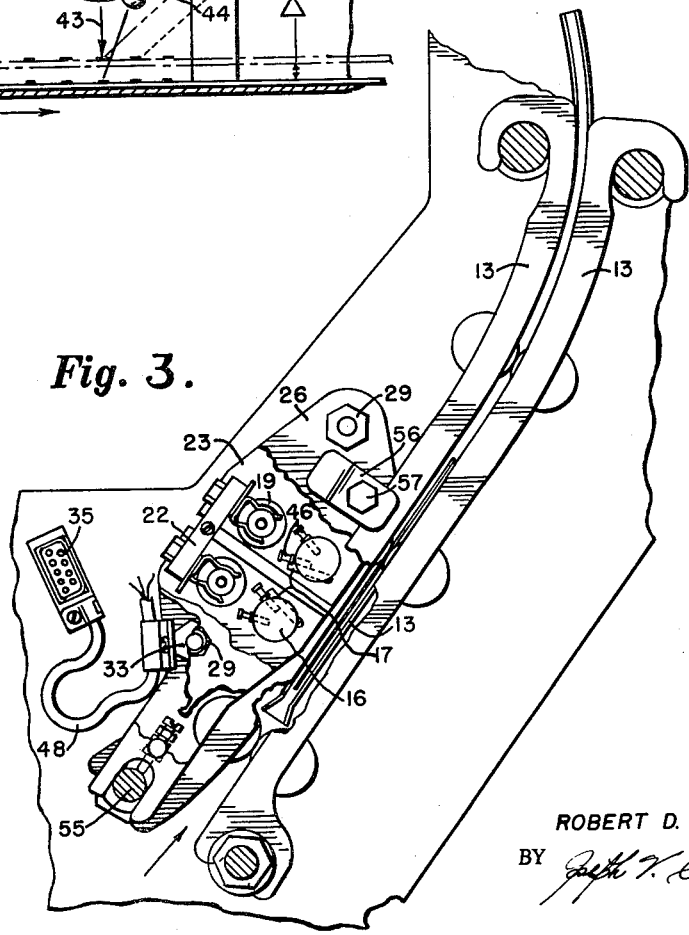
FIG. 3 is a view with parts broken away showing applicant's novel sensing assembly mounted in a document guideway.

As better shown in FIGS. 3 and 4 the sensing assembly is held in workable relationship to the document guide path by mounting rod 55 and clamp 56 and clamping screw 57. Mounting plate 23 is positioned and held in a plane which is substantially perpendicular to the longitudinal dimensions of the indicia carrying document. The rod-like lens 16 may be of circular cross section and made of any material such as Lucite or methyl-methacrylate. The lens has properties similar to spherical lenses in that the scattering or diverging light rays emitted by the lamp 19 and impinging on the lens will be condensed or focused in a convergent light beam forming a relatively narrow and uniform "bar of light" in the image plane or plane of the back plate 13. This lens has a longitudinal axis which is substantially parallel to the longitudinal axis of the lamp and also substantially parallel to the plane in which the indicia carrying documents lie. Lens 16 should be of sufficient length to overlay the indicia to be sensed and the cylindrical lamp. FIG. 9 clearly shows that lens 16 will condense the light rays from lamp 19 into a "bar of light" 42 which has a transverse dimension substantially equal to that of the indicia to be sensed.

Figure 5:
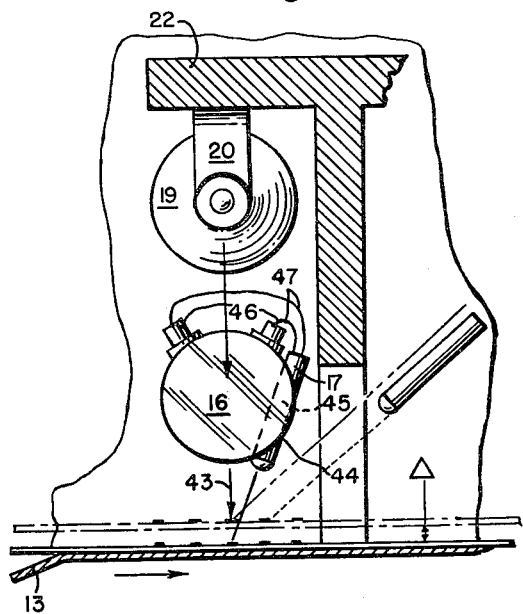
FIG. 5 depicts an end view of the reading apparatus in various positions of the photocell and the indicia carrying documents.

Light rays, as 43 reflected back to the lens from the document or backplate 13 as shown in FIG. 5 will intersect the lens at a point 44. If the light of reflection could pass through the lens unrefracted, it would define a cord of the lens and it is along this cord line that the photocell should be positioned. One end of the lens 16 is permanently mounted to mounting plate 23 so that there will be no movement of the lens relative to the light after it has been set in a predetermined position.

As shown in FIG. 2 a number of holes are provided, on the lens itself, to facilitate terminals such as 46 and to which terminals cell voltages are applied. These terminals may also be used as output means from the cell. The leads 47 from the photocells are soldered to these terminal plates 46 and leads 48 extending from these terminal plates are terminated in a plug 35. The chambers to house the photocell and the terminal plates therefor are positioned in the plastic rod in such a manner so as not to interfere with the light focusing function of the lens.

In an actual embodiment of this invention a Tungsol lamp, No. 211, was used. This bulb was mounted in cartridge clips spaced about 1 and ¼ inches apart. The rod was two inches long and ½ inch in diameter and made of methylmethacrylate which had been cast optically clear and polished. The photocell was a Texas Instrument's type 1N2175 having a diameter of 0.15 inch and was fixedly held in place in the rod by Du Pont Duco type cement.

The longitudinal axis of the lens was displaced $15/16''$ away from and parallel to the longitudinal axis of the lamp. The backplate or indicia carrying documents lie in a plane which is about ⅝" away from the longitudinal axis of the lens. The photocell was placed in a hole whose longitudinal axis, if projected to intersect the focused bar of light passing through the lens, would intersect this bar at a point in a plane which lies parallel to and ⅝" away from the longitudinal axis of the lens, and forms an angle of about 15° with the beam of light.

Figure 7:
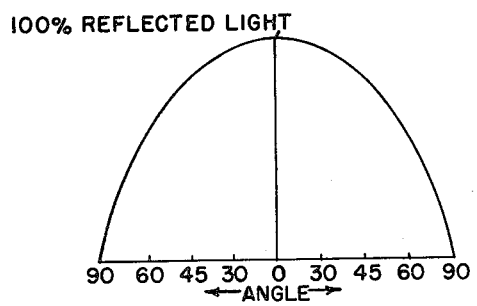
FIG. 7 is a typical cosine curve showing the amount of reflected light at various angles of photocell position.
Figure 6:
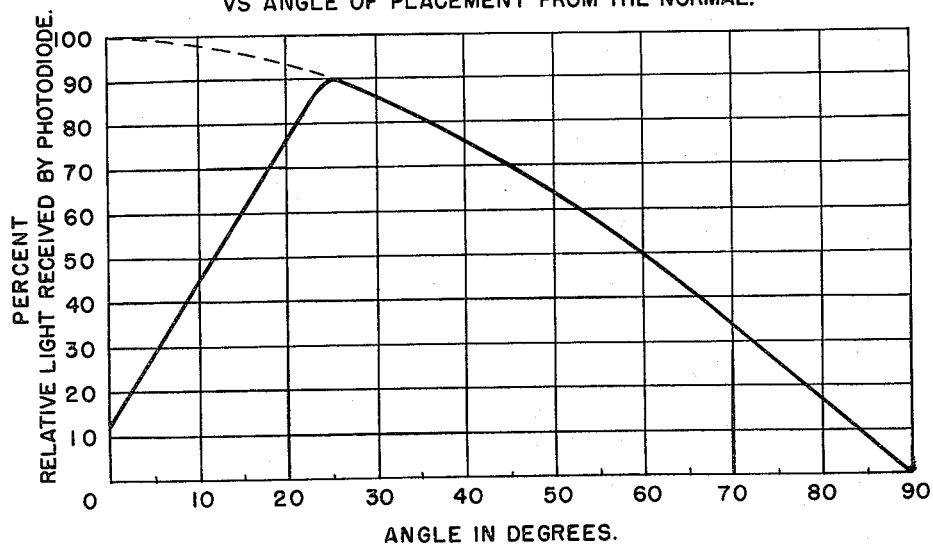
FIG. 6 is a graph of the amount of light reflected back to a photocell for various positions of the photocell relative to the focused beam of light.

As is shown in FIG. 6 a curve can be plotted to define the amount of reflected light which will be received by a photocell for various angles of the photocell relative to the focused bar of light. This angle is labelled as "$\alpha$" in FIG. 8. In the calculation of this curve it was assumed that the indicia bearing document is a perfectly diffusing reflector of light. If this is so, the intensity of reflected light from a small defined area would follow the well known cosine reflection law, as shown in FIG. 7, which is a graph of the reflected light for various angles of the photocell ranging from 0 to 90°. The curve of FIG. 7 shows that the greatest amount of reflected light would be seen by a photosensing element mounted directly in the focused light beam. The amount varies as the photocell is positioned at various angles "$\alpha$," until at 90° it would receive very little reflected light. However, a central positioning of the photocell along the focused beam of light and normal to the back plate or indicia bearing document as FIG. 7 would indicate, will block or eclipse light rays from the lamp source and result in a shadow being cast upon the indicia bearing documents, so that the photocell would be viewing the resulting umbra region and would result in ineffective reading of the indicia.

The optics section in Hausmann and Slack's text on Physics, third edition, seventh printnig, by D. Van Nostrand Co., Inc., in 1952, pp. 694–696, develops the following formula for the determination of the focal length of a thick lens;

$$\frac{1}{FL} = (u-1) - \left[\frac{1}{r_1} + \frac{1}{r_2} - \frac{(u-1)t}{u \cdot r_1 \cdot r_2}\right] \quad (1)$$

Where "$u$" is equal to the index of refraction, which would be equal to 1.5 for a Lucite rod, the radii $r_1$ and $r_2$ are each equal to ¼ inch for a ½ inch diameter rod. From the foregoing formula, the focal length FL, of the rod would be ⅜ inch.

Knowing the focal length and the distance, $Do$, that the lens is mounted from the light source, resort can then be made to the well known formula, $$\frac{1}{FL} = \frac{1}{Di} + \frac{1}{Do} \quad (2)$$

wherein all the factors except the image distance, $Di$, are known. With a focal length equal to ⅜" and a distance of lamp to len's center to center, of $15/16''$, the distance at which the image of the light source would focus will be ⅝" from the principal horizontal optical or axial plane of the lens indicated in FIG. 8. This then fixes the location of the guide plate 13. It must be borne in mind that, because a cylindrical lens is utilized, the image will be focused in one dimension only and will, therefore, appear as a bar of light.

A further consideration of the following well known optical law $$f \text{ number} = \frac{FL}{\text{useful lens diameter}} \quad (3)$$

which sets forth the practical limits of the light gathering and focusing power of a simple single lens, leads to the realization that, for an F2 system, which was selected after careful consideration of all the system factors as being satisfactory, having a short focal length of ⅜", that the useful thickness of the lens is $3/16''$. This knowledge leads to the conclusion that the photocell may be mounted on or in the lens itself, and yet not interfere with the focusing power of the lens. Knowledge of the fact that the lens would function as well if it were longitudinally sliced to $3/16''$, indicates that any mounting outside of the $3/16''$ area, or $3/32$ of an inch on either side of the principal vertical optical axial plane as shown in FIG. 8 will result in no interference by the photocell with the light passing through the lens.

In order to determine the angle "$\alpha$" at which the photocell should be mounted outside this critical lens area, the following analysis was made. As shown in FIG. 8 the dimension "$y$" which is the distance from the principal vertical optical plane to the center line of the photocell hole can be approximately defined in terms of hyperbolic functions to be equal to ($a$ sinh $\alpha$) where "$a$" is the distance along the focused bar of light from the image plane to the lens surface, and is assumed, for the moment to be a fixed distance. A further approximation can be made by defining "$y$" in terms of the unknown lens dimension "$w$" plus ½ of the photocell diameter, the latter being 0.15 inch for the photocell employed. This relationship can be stated by the formulae $$y = w + 0.075 \quad (4)$$

or $$w = y - 0.075 \quad (5)$$

Therefore, substitution of the hyperbolic definition of "$y$" in this last formula (5) will define a relationship of "$w$," which in turn represents the location of the photocell. This turns out to be $$w = a \sinh \alpha - .075 \quad (6)$$

Then by assuming various angles for "α," the following table resulted:

| f No. | α degrees | α radians | .357×sinh α | $w = .375 \sinh \alpha - .075$ | $\left(\frac{w}{.1875}+\frac{1}{2}\right) \times 100$ |
|---|---|---|---|---|---|
| 2 | 10 | .175 | .066 | .009 | 45.2% |
|   | 14 | .245 | .093 | .018 | 59.3% |
|   | 18 | .315 | .118 | .043 | 13.5% |
|   | 22 | .385 | .148 | .073 | 89.0% |
|   | 24.7 | .435 | .167 | .094 | 100.0% |

The column labeled $$\left(\frac{w}{.1875}+\frac{1}{2}\right) \times 100$$

is a relative measurement of the amount of effective light that will pass through the lens unimpeded by the blocking action of the diode, where "$w$" is the distance that the photocell is mounted from the principal plane, as shown in FIG. 8, and the factor .1875 is equal to 3/16 of an inch or 1/2 of the critical focusing area or effective diameter of the cylindrical lens, which was determined to be 3/16 inch from Equation 3. Then to compensate for the fact that only one side of lens is affected by the angle considered, the factor 1/2 is added. A look at the chart indicates that 24.7° results in an efficiency of 100%. The curve of FIG. 6 further shows that after this critical angle of 24.7° is passed, the percent of relative light received by the photo diode decreases almost linearly until it reaches zero at 90°.

These findings then dictate that, with the foregoing fixed conditions, the best results would be obtained by placing the photocell at a distance "$w$," as defined by FIG. 8, of .094 inch, and at angle "α" of 24.7°.

However, a further consideration in the positioning of the photocell is the factor of lateral movement, along the document guidepath, of the document relative to the lens or displacement of the document toward the lens. This displacement of the document relative to the lens is illustrated by the distance Δ in FIG. 5, and is in the order of magnitude of the thickness or width of the indicia being sensed thereby. This displacement injects a further variable and consideration in the angular location and positioning of the photocell, which should be located to be least susceptible to lateral movement of the document and yet still be in a position of high reflected light level. As shown in FIG. 4, the indicia 15 takes the form of a number of distinct horizontal strips, which are vertically spaced apart from each other and aligned in a vertical column. There, of course, can be as many columns as desired, there being available the same number of optical detectors as there are columns of indicia to be sensed. As shown, the indicia has a small transverse dimension of 0.025 inch compared to its longitudinal dimension of 0.200 inch which extends in a direction normal to the direction of travel of the document. With the light shaped and filtered into a bar of light, the transverse dimension of which is subtantially equal to the transverse dimension of the indicia to be sensed, and this bar of light focused on the document a given distance from the lens, there will be reflected back from the document a beam of reflected light. With a Lucite rod of a given diameter, it has been found that the most reflected light will be reflected along a line which forms an angle of approximately 0° with the focused beam of light, as indicated in FIGS. 6 and 7. This consideration also leads to the conclusion that the photocell should be mounted as close to the focused bar of light as possible.

The advantage of mounting the photocell as near to the focused bar of light is brought out by FIG. 5 where the comparison is made between the photocell mounted on and projecting through a lens and one mounted outside the lens. In FIG. 5 both photocells are shown as scanning two documents one of which is at a normal position for documents, and the phantom document depicts one which has assumed a lateral displacement from the normal position. As is quite evident from the figure, the photocell mounted in the lens and near to the principal plane is still able to scan the indicia on the laterally displaced phantom document whereas this is impossible for the externally mounted photocell.

Therefore, by employment of the results of the curve as shown in FIG. 6, and taking into consideration the lateral movement of the documents, relative to the lens position, and the effective scanning zone of the selected photocell, the maximum return of reflected light is found to be obtained by a unique arrangement wherein the photocell is mounted directly in the lens itself. A compromise of the various above discussed considerations yielded optimum results by the positioning of the cell in a hole along a cord line of the cylindrical lens which formed an angle of approximately 15° with the intersection of the focused bar of light and the indicia bearing document. This angle of approximately 15° was found to provide a position for the photocell which was relatively close to the focused bar of light and yet did not block any appreciable amount of light to the document. It also provided a position which permits a relatively wide range of lateral movement of the document without resulting in a loss of reflected light to the stationary photocell.

Photosensitive cell 17 is inserted in hole 45 as shown in FIG. 5. This photocell not only fits into the aperture 45 but extends through it. The end of the photocell that projects through the lens nearest the document or back plate is the light sensitive portion of the cell. While an arrangement having a photocell, which is embedded in but which does not extend through the lens, could be employed, it has been found that the light sensitive end portion of the photocell will be susceptible to the greatest proportion of the reflected light if it is exposed or located out of the path of any light refracted by the lens. This follows from the fact that the reflected light if it is permitted to re-enter the lens will be refracted and thus not follow a straight line through the lens to the embedded photosensitive area of the cell. However, an arrangement wherein the sensitive area of the cell is extended through the lens will permit the action of the reflected light on the photocell before the light reenters the lens, and therefore will be uninfluenced by the refraction by the lens.

In the actual operation of the invention a document such as is shown in FIGS. 2 and 4 will be transported past the optical reading stations. In the absence of a document the light will be focused on the backplate 13 as is shown in FIG. 3. Further, in the absence of a document the high absorption properties of plate 13 will reflect very little light back to photocell 17. Now as the document progresses toward the reading station the focused beam of light will impinge upon uncoded areas of the paper. The uncoded area of the document has a high diffused light level and therefore most of the light impinging on it will be reflected back, and the photocell 17 which has been ideally mounted in a unique arrangement in the lens itself will be activated.

However, as soon as a coded stripe of indicia occupies the narrow scanning zone of the optical reader, then, since the focused beam of light and the indicia have substantially the same transverse dimension, the beam of light will be substantially absorbed by the indicia. The light level at the scanning zone of the photocell will therefore be quite low. The photocell is critical to this reduction of light level and increases in resistance as less light impinges upon it. This change in resistance of the photocell results in the emission of an output pulse. This operation is repeated for each stripe of coded indicia which transverses the scanning zone of the optical reader.

As is shown in FIG. 4 it may be essential that the indicia. All that is required to accomplish this end is that the optical reading equipment be displaced a predetermined amount from each other so that the indices in the first column are transported past their optical reader before the second column enters its scanning zone. As an alternative, electronic control and storage systems may be utilized which enable the simultaneous reading of all the columns of indicia, but which also permits the storage of the various columns of information and then processes them in the desired order.

The electrical signals which are generated by the optical reader for every stripe of coded indicia are then transmitted to a decoding apparatus which transforms the signals into intelligible information. The information may be alpha or numeric in character.

It should be understood that the description of a typical embodiment of the invention is intended to be merely illustrative and that many changes in matter of detail may be made in the apparatus by persons skilled in the art without departing from the spirit of the invention.

What is claimed is:

1. An optical system projecting light on and responsive to light reflected from an object, comprising a source of illumination, a lens located between said source and said object and focusing diverging light rays impinging thereon from said source on said object in a converging light beam on both sides of and containing an optical axis of the lens normal to the object, said lens having an opening therein located off-centrally and to one side of the said optical axis thereof a distance that is less than the radius of curvature of the lens as measured along a principal plane of the lens normal to the aforesaid optical axis thereof, and a light response device secured in said opening in said lens and having a light sensitive surface facing said object at an acute angle to the plane of the object to receive illumination reflected therefrom.

2. An optical system in accordance with claim 1 above wherein said lens is a cylindrical rod having its longitudinal axis parallel to the plane of the object and the opening in the lens is transverse to the longitudinal axis of the lens.

3. An optical sensing system in accordance with claim 2 above wherein the opening in said lens for said light responsive device is displaced from the axial center of the lens by a distance which is greater than the useful optical radius of the lens but less than its cylindrical radius of curvature.

4. An optical sensing system comprising a source of illumination for illuminating an object, a focusing lens located between said source and said object and focusing diverging light rays impinging thereon from said source on said object in a converging light beam on both sides of and containing an optical axis of the lens normal to the object, said lens having an off-centrally located opening therein extending transversely therethrough at an acute angle to and intersecting the said optical axis thereof at said object, and a light responsive device secured in said opening in said lens and having its light sensitive surface inclined to the plane of said object to receive illumination reflected therefrom.

5. An optical sensing system in accordance with claim 4 above wherein said acute angle is approximately 15°.

6. An optical sensing system in accordance with claim 4 above wherein said lens is cylindrical.

References Cited by the Examiner

UNITED STATES PATENTS

| | | | |
|---|---|---|---|
| 2,231,494 | 2/41 | Dickinson | 250—227 X |
| 2,420,716 | 5/47 | Morton et al. | 250—227 |
| 2,631,243 | 3/53 | Weber et al. | 250—219 X |
| 2,755,401 | 7/56 | Tirico | 250—216 X |
| 2,816,705 | 12/57 | Thrall et al. | 250—239 X |
| 2,838,683 | 6/58 | Munro | 250—227 |
| 2,920,209 | 1/60 | Asten | 250—239 |
| 3,035,489 | 5/62 | Simons | 88—57 |

FOREIGN PATENTS 616,831   1/49   Great Britain.

RALPH G. NILSON, *Primary Examiner.*

ARCHIE R. BORCHELT, *Examiner.*

UNITED STATES PATENT OFFICE
CERTIFICATE OF CORRECTION

Patent No. 3,194,969　　　　　　　　　　　　　　　　July 13, 1965

Robert D. Chute

It is hereby certified that error appears in the above numbered patent requiring correction and that the said Letters Patent should read as corrected below.

Column 2, line 33, for "posses" read -- possesses --; column 3, line 68, before "as" insert a comma; line 74, for "printnig" read -- printing --; column 4, lines 3 to 5, for that portion of formula (1) reading "=(u-1)-" read -- =(u-1) --; column 7, lines 10 and 11, after "indicia" insert -- in one column be read before another column of indicia --.

Signed and sealed this 19th day of April 1966.

(SEAL)
Attest:

ERNEST W. SWIDER
Attesting Officer

EDWARD J. BRENNER
Commissioner of Patents